United States Patent [19]

Kotcharian

[11] 4,366,917
[45] Jan. 4, 1983

[54] CRYOGENIC TANK

[75] Inventor: Michel Kotcharian, Paris, France

[73] Assignee: Technigaz, France

[21] Appl. No.: 177,225

[22] Filed: Aug. 11, 1980

Related U.S. Application Data

[60] Continuation of Ser. No. 914,681, Jun. 12, 1978, abandoned, which is a continuation-in-part of Ser. No. 748,755, Dec. 8, 1976, abandoned, which is a division of Ser. No. 622,414, Mar. 1, 1976, Pat. No. 4,105,819.

[30] Foreign Application Priority Data

Mar. 4, 1975 [FR] France .................. 75 06732
Feb. 20, 1976 [FR] France .................. 76 04810
May 23, 1978 [FR] France .................. 78 15303

[51] Int. Cl.³ .............. B65D 25/14; B65D 25/18; B65D 90/02
[52] U.S. Cl. .................. 220/442; 220/441; 220/460; 220/901
[58] Field of Search ........... 220/450, 452, 440, 441, 220/456, 457, 442, 443, 461, 460, 901; 52/249; 428/213, 242, 246, 251, 433, 252, 286, 247

[56] References Cited

U.S. PATENT DOCUMENTS

| | | | |
|---|---|---|---|
| 2,882,183 | 4/1959 | Bond et al. | 428/251 |
| 3,138,517 | 6/1964 | Charbonnean | 428/251 X |
| 3,206,057 | 9/1965 | Pren | 220/443 X |
| 3,253,731 | 5/1966 | Fink | 220/450 X |
| 3,265,236 | 8/1966 | Gibbon et al. | 220/423 |
| 3,341,051 | 9/1967 | Forman et al. | 220/450 |
| 3,383,004 | 5/1968 | Closner | 220/901 X |
| 3,392,864 | 7/1968 | Perkins, Jr. | 220/901 X |
| 3,400,849 | 9/1968 | Pottier et al. | 220/450X |
| 3,406,858 | 10/1968 | Jackson | 220/901 X |
| 3,485,409 | 12/1969 | Becker | 220/440 X |
| 3,489,311 | 1/1970 | Folkerts et al. | 220/450 X |
| 3,757,982 | 9/1973 | Isenberg et al. | 220/901 X |
| 3,795,573 | 3/1974 | Smith et al. | 220/901 X |
| 3,814,275 | 6/1974 | Lemons | 220/450 X |
| 3,948,406 | 4/1976 | Papanicolaou et al. | 220/901 X |
| 3,993,213 | 11/1976 | Burge et al. | 220/450 X |

FOREIGN PATENT DOCUMENTS 1381477 11/1964 France .................. 220/901

*Primary Examiner*—Allan N. Shoap
*Attorney, Agent, or Firm*—Steinberg & Raskin

[57] ABSTRACT

A cryogenic tank comprising an innermost fluid-confining wall forming a primary barrier made form relatively thin, flexible, impervious, sheet-like laminated building material comprising at least three continuous overlying layers of yielding material adapted to withstand very severe cold conditions, bonded together and consisting of at least one first mechanically strong supporting outer layer, at least one impervious film-like intermediate layer and at least one second inner lining layer providing at least a mechanical and at least temporary protection.

1 Claim, 7 Drawing Figures

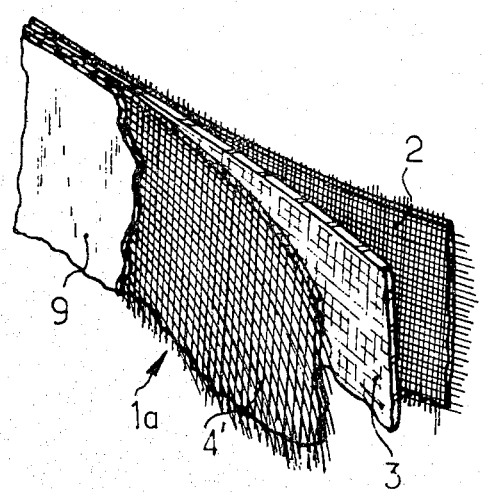
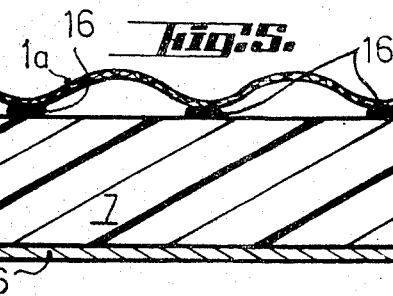
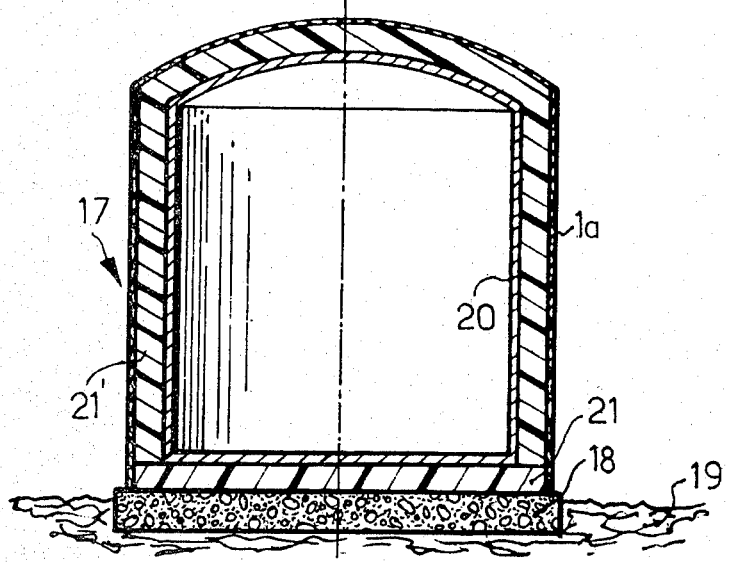

CRYOGENIC TANK

This is a continuation application of Ser. No. 914,681, filed June 12, 1978, and now abandoned, which is a continuation-in-part application of Ser. No. 748,755, filed Dec. 8, 1976, and now abandoned, and which is a divisional application of Ser. No. 622,414, filed Mar. 1, 1976, and now U.S. Pat. No. 4,105,819 issued Aug. 8, 1978.

The present invention relates generally to and has essentially for its subject matter a fluid-tight, heat-insulated cryogenic tank or like improved fluid-confining enclosure, vessel or container for holding very cold fluids and incorporating a relatively thin and flexible or yielding, sheet-like or strip-like or web-like, composite material for building or structural, lining facing, covering, lagging or like fitting purposes, having a substantially impervious or fluid-tight or leak-proof laminated construction.

In the prior state of the art there are presently known heat-insulated, sealed or fluid-tight, impervious or leak-proof tanks for storing, preserving, transporting or conveying in particular very cold fluids and more specifically liquids at very low temperatures such as for instance liquified natural gases for methane which are in particular contained in multiple-wall tanks of for instance the so-called integrated kind with a substantially rigid outer structure forming a self-supporting envelope or casing, said tank comprising an innermost envelope for directly confining the fluid held therein, said envelope being located inside of and spaced from the outer envelope and forming a thin wall consisting of a substantially flexible impervious membrane made most often from a foil or thin sheet of metal such as aluminum, stainless steel, so-called Invar alloy or from any other suitable metal exhibiting equivalent properties or like qualities of resistance to a very low temperature conditions. The intermediate space between said respectively outermost and innermost end envelopes is filled with an intermediate relatively thick layer of heat insulating material secured to the outer structure for being carried or supported by the latter and spacing said membrane from said outer structure, which membrane is applied against said intermediate layer which consists preferably of a substance or compound adapted to bear mechanical loads (such as weight, hydrostatic pressure, inertial forces, dynamic stresses or efforts etc.) applied to the body of contained fluid and to convey them to said outer structure. Said metal membrane is either practically insensitive to or unaffected by dimensional variations caused by deformations or strains such as contractions and expansions of thermal origin when it is made of so-called Invar alloy for instance or it is formed with excess material for instance in the shape of corrugations, pleats or similar folded formations enabling to absorb such thermal deformations when it is made from another metal. Such tanks adapted in particular for the preservation or storage of liquified natural gases (generally stored at a pressure about ambient atmospheric pressure) may either form stationary storage enclosures or storage enclosures or transportation tanks mounted on board of tanker-ships or conveying land-vehicles, in which case the inner tank-casing, shell or envelope is integrated into the ship's hull of which it then forms the hold for loading liquid cargo therein or into the land-vehicle body structure, the hull or body then forming the aforementioned outer self-supporting structure or rigid envelope.

The aforesaid metal membrane, the exposed inner face or side of which is in direct contact with the fluid contained therein, provides a so-called primary sealing barrier but the innermost envelope consisting of said membrane is often doubled by at least another intermediate envelope forming an impervious wall lying between said outer structure or envelope and said primary barrier to constitute a safety or so-called secondary sealing barrier which is often substantially of the same nature and configuration as the primary sealing barrier. Such metal membranes forming a normal (or main) sealing barrier and a safety (or auxiliary) sealing barrier, respectively, suffer from the inconvenience of being of a relatively complicated and therefore expensive preparation, manufacture, building or making as well as of a relatively difficult and costly positioning, mounting, assembly and fastening and they are generally made from noble and accordingly expensive metals while being relatively heavy in weight.

One main object of the invention is accordingly to remove or overcome the aforesaid drawbacks by providing an improved tank construction incorporating a new material forming a relatively thin and flexible or yielding sheet-like, plate-like or strip-like substantially fluid-tight laminated semi-product, said construction being characterized in that said material comprises at least three overlying continuous layers or laminations made from flexible material adapted to withstand very severe cold conditions and assembled or connected together by bonding, sticking, gluing, welding or through a like or equivalent superficial adhesive connection and consisting of:

(a) at least one first outermost or end layer forming a tough or mechanically strong supporting means;
(b) at least one intermediate or central layer consisting of a film or skin impervious in particular to gaseous fluids; and
(c) at least one second end or innermost or exposed layer forming an at least mechanically and at least temporarily protective lining or facing.

According to another characterizing feature of the invention said intermediate layer which is placed between both aforesaid opposite end layers in a sandwich-like manner is made from metal whereas said end layers are non-metallic and preferably made from suitable synthetic materials or artificial substance adapted to comply with technological conditions and operating requirements prescribed by their final use, service destination or working conditions.

The novel and improved tank construction according to the invention offers the advantage of a very simple and easy manufacture, working and use of said material as well as of a ready laying or mounting thereof in particular through simple bonding by means for instance of a suitable synthetic resin so that it is of a very economical use and production while exhibiting outstanding qualities, capabilities or abilities of behaviour under cold conditions, mechanical endurance and physical durability and preservation.

According to whether said second end layer is adapted to remain exposed, bare or uncovered (in particular when the material is intended to form a primary sealing barrier of a tank) or is to be covered i.e. concealed or hidden (for instance when this material is used as such as an intermediate layer incorporated into the inside of a multiple-wall tank structure while being in particular integrated into the thickness of a layer of heat insulating material forming one of the component elements of such a tank wall construction, said intermediate layer then constituting a secondary sealing barrier), the nature or constitution of this layer is different and adapted to the use which meets the purpose set for said building material in said tank.

According to still another characterizing aspect of the invention, the primary sealing barrier of the tank is made from the aforesaid material the second end layer of which would then suit such a function.

According to a further characterizing feature of the invention when said tank comprises at least one secondary sealing barrier the latter is made from said building material the second end layer of which is adapted to suit such a function.

According to a preferred embodiment of the invention, the heat-insulated fluid-tight tank of the invention comprises a laminated sheet material including at least three layers, as follows:

one first end layer having a thickness of from about 0.3 to about 0.6 mm;
one intermediate layer consisting of a film or skin having a thickness of from about 0.04 to 0.10 mm; and
one second end layer having a thickness from about 0.3 to 0.6 mm.

The laminated sheet material of the tank according to said preferred embodiment may notably comply with one of the following more preferred constructions.

In a first construction of the said laminated material, the aforesaid intermediate layer is made from a material selected from the group consisting of aluminum and stainless steel while said first end layer is a flexible mineral fiber fabric notably a glass fiber fabric, and said second end layer is also a flexible mineral fiber fabric, notably a glass fiber fabric, each said first and second end layers having a thickness between 0.3 and 0.6 mm.

In a more specific construction, each of said opposite end layers is a flexible glass fiber fabric having preferably a thickness between 0.3 and 0.4 mm and said intermediate layer is an aluminum sheet or foil having preferably a thickness between 0.04 and 0.07 mm.

In a second particular construction in accordance with the aforesaid preferred embodiment, the laminated sheet material of the invention tank, comprising the abovementioned three layers, includes also a fourth layer having preferably the form of a coating applied originally in a finely divided state and constituting a continuous covering of the said laminated sheet material, the material of this fourth layer being selected from the group consisting of a polyurethane elastomer, a chlorosulfonated polyethylene elastomer and a polychloroprene elastomer and having preferably a thickness of from about 0.3 to 1 mm.

The invention will be better understood and other objects, characterizing features, details and advantages thereof will appear more clearly as the following explanatory description proceeds with reference to the accompanying diagrammatic drawings given by way of non limiting examples only illustrating various presently preferred specific forms of embodiment of the invention and wherein:

FIG. 3 is a view similar to FIG. 2 but showing another construction according to the preferred embodiment of the invention, the material of this construction being particularly adapted to form a vapor leak-proof or secondary sealing barrier or another type of primary barrier within the invention tank;

FIG. 5 is a fragmentary cross-sectional view showing a configuration for applying and fastening the material illustrated in FIG. 3 and forming a primary sealing barrier to the innermost face of the layer of heat insulating material of the wall structure of a heat-insulated fluid-tight tank according to the invention, the tank having a primary barrier which forms an integrated container;

Figure 7:
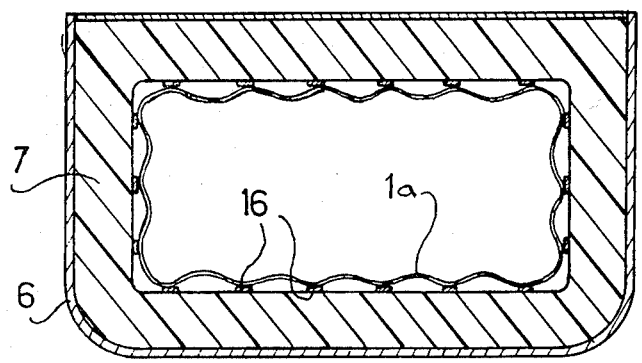

FIG. 6 is a vertical section on a smaller scale of a closed heat insulating fluid-tight tank according to the invention with an externally heat-insulated self-supporting rigid container and having an outer layer of heat insulating material which is surrounded or encompassed at least for its major part by a vapor leak-proof impervious envelope consisting of the material illustrated in FIG. 3; and FIG. 7 is a vertical section of a closed heat insulating fluid-tight tank according to the invention wherein the material of FIG. 3 in the configuration of FIG. 5 forms a primary sealing barrier to the innermost face of the layer of insulating material of the wall structure of the tank.

Figure 1:
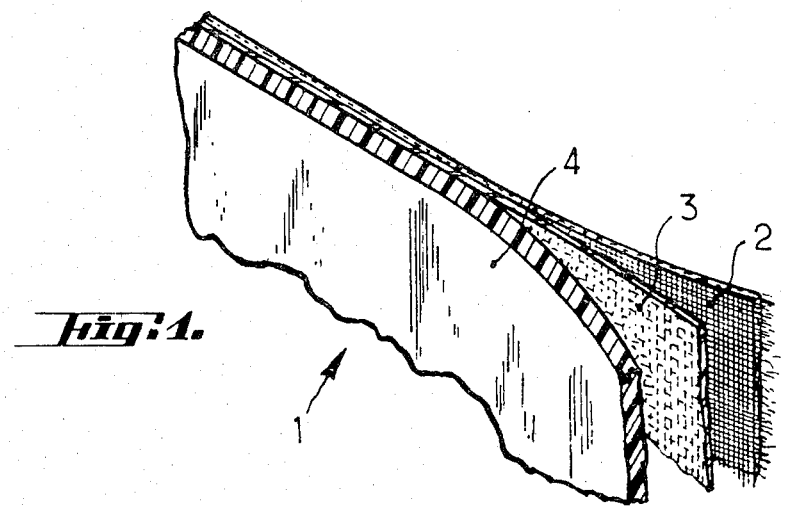
FIG. 1 is a fragmentary perspective view partially in section or with parts broken away, showing the new material for a primary sealing barrier of a tank according to the invention, the material having various component layers which have been shown partially separated from each other at their end portions to better disclose the composition of the material.

According to the embodiment shown in FIG. 1 of the drawings the new material for a primary sealing barrier of a tank according to the invention, generally denoted by the reference numeral 1, comprises an outermost or possibly hidden layer 2 consisting preferably of a fabric made from mineral fibers such as glass fibers for instance or of an equivalent (artificial or synthetic) chemical textile material. The intermediate layer 3 is made from a film, skin, foil or thin sheet of a metal such as aluminum, stainless steel, so-called Invar alloy or from any other equivalent noble metal. The innermost layer 4, the inner face or side of which is adapted to remain exposed, i.e. bare and in direct contact with the cryogenic fluid, forms a fluid-tight preferably resilient safety lining consisting in particular either of a polyurethane elastomer, such as the substance known under the name of "Adiprene", or of a silicon elastomer, such as the substance known under the name of "Frigetan", or from any other equivalent artificial or synthetic plastics material preferably exhibiting elastomeric properties, or of a synthetic rubber.

By way of example the outermost layer 2 has a thickness of about 0.3 mm, and the thickness of the innermost layer 4 is of about 1 mm, whereas the thickness of the intermediate layer 3 may be on the order of a few hundredths of a millimeter.

Figure 2:
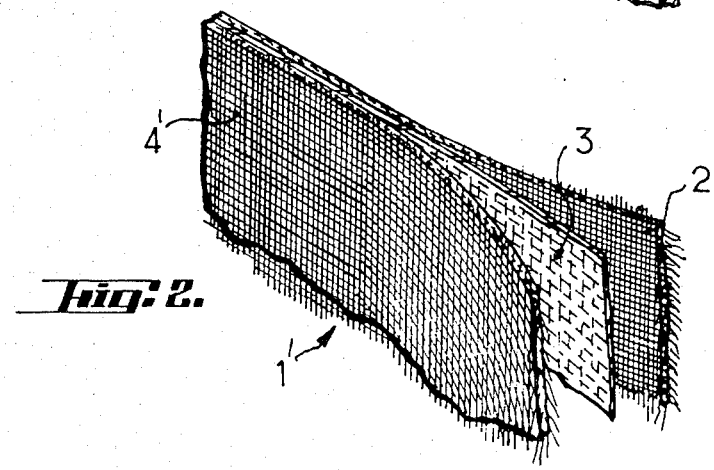
FIG. 2 is a view similar to the foregoing one but showing the material according to the preferred embodiment of the invention, this material being here more particularly adapted to form a secondary sealing barrier of said tank.

FIG. 2 shows the composition of the new material 1' adapted to form notably a secondary sealing barrier of a tank according to the invention. The outermost layer 2 and intermediate layer 3, respectively, have the same constitutions as in the case of the primary sealing barrier, whereas the innermost layer 4' is here made from a substance adapted to enable an easy bonding and which is for instance substantially identical with or similar to the innermost layer 2 as far as the nature and thickness of the material are concerned. Therefore the layer 4' may consist of a fabric or web of mineral fibers such as glass fibers or of an equivalent (artificial or synthetic) chemical textile material so that the assembly 1' forms a sandwich type of construction.

Each of the layers 2 and 4' consists notably of a fabric made of mineral fibers such as glass fiber and having a thickness of from about 0.3 to about 0.6 mm, preferably of from about 0.3 to 0.4 mm, while the intermediate layer 3 is made from a film, skin, foil or thin sheet of a metal such as aluminum or stainless steel and has a thickness of from about 0.06 to about 0.10 mm, preferably 0.04 to 0.07 mm.

The structure shown in FIG. 2 may set a limit upon the utilization capabilities of the material 1' having a construction as defined hereinabove to a relatively physical position or location incorporated into or inside of a body of surrounding coherent or solid material in which said first-named material is thus embedded or entrapped.

The construction shown in FIG. 3 enables to extend the possibility of using the invention material to a wide variety of utilizations and services thereby substantially broadening the scope of its applications.

The arrangement of FIG. 3 offers the advantage of enabling the use of the aforesaid material as an exposed, either visible or hidden, superficial lining end layer onto any wall structure thereby being very interesting from an economical standpoint since the material is relatively inexpensive and of an easy workability as well as of a simple application while exhibiting a satisfactory mechanical strength or toughness as well as a good thermal behaviour.

According to the form of embodiment shown in FIG. 3 the new tank-building composite laminated material generally designated 12 comprises an intermediate metal layer 3 having the nature previously defined (aluminum or stainless steel) and a thickness of from about 0.4 to 0.10 mm and preferably 0.04 to 0.07 mm which is positioned between two opposite end or bounding layers 2' and 4', respectively, consisting each of a fabric or web of glass fibers having a thickness of for instance between about 0.3 and 0.6 mm, preferably about 0.3 to 0.4 mm, these three layers being bonded or laminated together. One of the end layers which is adapted to remain exposed, i.e. layer 4' in the illustrated example, to form an exposed uncovered face after the material 12 has been applied against an end or boundary face of a tank wall structure (to constitute for example a primary barrier therefor when said wall structure together with said primary barrier forms the heat-insulating composite wall of the heat-insulated fluid-tight tank) will receive after the material 12 has been laid a protective film of elastomeric material 9 applied as by being spread in a powdery condition onto the tank wall surface thus consisting of the material 1' after the latter has been laid onto the tank wall supporting structure. The film 9 thus constituting the exposed end or boundary face of the material 12 will protect the layer 4' against mechanical effects, actions or attacks of any kind.

The elastomeric material of the protective film 9 is selected from an elastomeric polyurethane, polychloroprene or chlorosulfonated polyethylene, and has preferably a thickness of from about 0.3 to 1 mm.

The aforesaid polyurethane elastomer is notably the substance known under the name of "Adiprene", the polychloroprene elastomer is notably Neoprene and the chlorosulfonated polyethylene is notably the substance known under the name of "Hypalon".

The present invention is also concerned with a process of assembling in surface a plurality of sheets made from the abovementioned composite material having two fibrous end layers, this process being characterized in that the adjacent sheets are disposed in such a manner that their peripheral edges are superimposed, an adhesive composition being located between the two fibrous end layers in mutual content, belonging to said superimposed edges, so as to penetrate between the fibers of the said fibrous end layers and such to ensure a very strong binding between the adjacent sheets.

Figure 4:
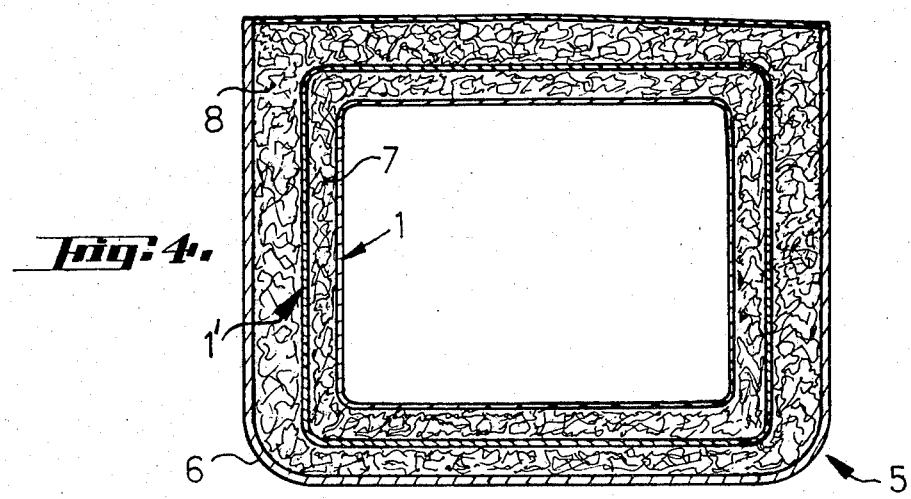
FIG. 4 is a cross-sectional view on a smaller scale of a cryogenic tank according to the invention into which are incorporated the materials illustrated in FIGS. 1 and 2.

FIG. 4 illustrates a cryogenic tank 5 according to the invention to which the aforesaid materials are applied. This tank comprises an outer rigid envelope or casing 6 made for instance from metal or from reinforced or prestressed concrete in the case of a stationary storage tank provided on land or it is constituted by the double hull of a tanker-ship or like conveyance or by the structural body of a land vehicle in the case of movable or travelling plants. The inner impervious envelope 1 forming a primary sealing barrier has its wall consisting of a membrane made from the material shown in FIG. 1 (or of that shown in FIG. 3, according to a variant) and the tank may comprise at least one intermediate fluid-tight safety layer 1' forming a secondary sealing barrier the wall of which consists of the material shown in FIG. 2 (or of that shown in FIG. 3, according to a variant). The primary sealing barrier 1 and the secondary sealing barrier 1', respectively, are spaced from each other as well as from the wall of the outer envelope 6 and the intermediate spaces, thus left or defined between both barriers 1, 1' on the one hand and between the seondary barrier 1' and the outer envelope 6 on the other hand, are filled with layers of heat-insulating material 7 and 8, respectively, made for instance from cellular foam or expanded plastics material, from Balsa wood or from any other equivalent solid or coherent substance against the corresponding adjacent surfaces of which the primary barrier 1 and the secondary barrier 1', respectively, are secured or fastened as by bonding.

As already stated previously the component layers of the material according to FIG. 1 as well as to FIGS. 2 and 3 are mutually assembled to each other as by bonding, gluing, sticking, welding or any other suitable equivalent means.

FIG. 5 illustrates one portion of a closed heat-insulated fluid-tight tank, which tank is shown in section in its entirety in FIG. 7, in particular for holding very cold fluids, of the type shown in FIG. 4, forming a multiple-wall tank integrated into an outer rigid self-supporting enclosing structure or envelope 6 and comprising an innermost thin wall 1a, for confinement of the contained fluid, consisting of a flexible impervious membrane forming a primary sealing barrier and at least one relatively thick intermediate layer of heat-insulating material 7 internally secured to said outer structure 6 and spacing the latter from said membrane applied against said intermediate layer, said heat-insulating layer 7 being adapted to bear the loads applied by said cryogenic fluid and to convey them to said outer structure 6. According to the invention said primary barrier consists of the material 1a shown in FIG. 3 the inner or exposed face of which is covered or coated with said protective plastics film 9 applied after said material has been laid. It should be understood that as in the case of the embodiment illustrated in FIG. 4 the layer of heat-insulating material 7 may itself incorporate in its thickness a secondary or intermediate sealing barrier (not shown in FIGS. 5 or 7) such as denoted at 1a in FIG. 4 and spaced outwards from the primary barrier thereby dividing the layer of heat-insulating material into two inner and outer layers 7 and 8, respectively, (see FIG. 4), this secondary barrier completely surrounding the primary barrier and being constituted by the material 1′ shown in FIG. 2, i.e. devoid of the protective elastomeric film 9.

In the embodiment illustrated in FIGS. 5 or 7 this primary sealing barrier 1a is advantageously secured locally as by bonding at discrete mutually spaced points 16 to said layer of heat-insulating material 7 while leaving an excess of material for instance as pleats, folds or corrugations between the successive connecting points 16 so that the geodesic distance between any two such neighbouring points on the surface of said layer of heat-insulating material 7 is smaller than their curvilinear distance on the surface of said primary barrier 1a. This arrangement offers the advantage of a flexible mounting of the material 1a with its wavy configuration enabling the corrugations thereof to readily close at least partially under the action of the pressure applied as well as contractions of thermal origin.

FIG. 6 illustrates a closed heat-insulated fluid-tight tank 17 adapted in particular for the storage of very cold fluids and in particular of cryogenic liquids and resting or built for instance on a foundation slab or base 18 made from concrete and at least partially embedded into the ground 19. This tank, for instance of a substantially vertical cylindrical shape, is of the type consisting of an in particular metallic, impervious, substantially rigid, and self-supporting container or shell 20 externally surrounded by at least one layer of heat-insulating material secured to the outer wall surface of said container or shell. This heat-insulating layer may for instance comprise a horizontal lower or bottom base layer 21 consisting for instance of a substance known under the name of foam-glass as well as side and upper or top layers 21′ made for instance from polyurethane foam or from a like expanded substance. This heat-insulating layer is itself surrounded by an envelope at least over all its exposed outer (in particular side and top) surface, and according to the invention this external envelope forms a fluid-tight vapor leak-proof barrier consisting of the material 1a shown in FIG. 3.

Thus, the tanks of FIGS. 4 and 6 include the substantially rigid, self-sustaining wall means (6 in FIG. 4 and 20 in FIG. 6) for surrounding a hollow interior space of the tank in which the cryogenic fluid is to be stored, this wall means having inner and outer surfaces. Next to and in engagement with one of these surfaces is a heat-insulation means, formed by components 21 and 21′ in FIG. 6 and by heat-insulation layers 7, 8 and secondary barrier layer means 1a in FIG. 4. Thus, in both embodiments this heat-insulation means has a surface distant from and directed away from the wall means 6 or 20, and at this latter surface of the heat-insulation means there is a flexible barrier layer means of the invention, formed by the barrier layer means 1a in FIG. 6 and the barrier layer means 1 in FIG. 4. Of course, in the embodiment of FIG. 4, the heat-insulation means is itself divided into a pair of heat-insulating layers 7, 8, which are separated from each other by the secondary barrier layer means 1′.

The embodiment wherein the two end layers of the laminated composite material are fiber glass layers produce surprising or unexpected effects since this triplex material enables the obtainment, in an extremely easy manner, of a coating for a highly fluid-tight cryogenic tank by juxtaposing in surface, as previously indicated, sheets of the said material and by binding them along their superposed peripheral edges on a bed of heat insulating blocks or panels, by means of an adhesive, without the necessity of applying a squeezing pressure, the assembling and gluing operation being performable at room temperature.

This outstanding advantage is essentially due to the symmetrical construction of the triplex material, since this embodiment enables the mutual contact of two rough or coarse surfaces, consisting of fibers, in such conditions that the bonding strength is maximum on the one hand due to the uneven surfaces of the involved overlaying layers, resulting in a strong grip or fast clinging of both layers, along the peripheral edges of the sheets of the laminated composite material and on the other hand owing to the penetration of the adhesive within each said layers, on both sides of their interface, this penetration being precisely permitted by the porous structure of such layers.

Under such circumstances, a very satisfactory bonding may be obtained without applying an external squeezing pressure and without heating so that the assembling operation may be easily carried out manually.

Moreover, the risk of undergoing separation through a cleaving action which would exist in the case of the adhesive bonding of smooth or even surfaces is avoided by using the invention composite material.

Comments will now be given as to the criticality of the various respective thicknesses of the different layers of the invention material, as to the obtention of excellent characteristics of suppleness, mechanical strength and fluid-tightness.

In the first place, using glass fiber layers having a thickness lower than 0.3 mm would result in a tensible strength insufficient to support the edges stresses caused by the contraction of the heat-insulating blocks or panels backing the triplex material, such stresses being due to the thermal contractions to which said panels are subjected; moreover these glass fiber layers would not be likely to resist the stresses or strains caused by an accidental cracking of such an underlying panel.

On the other hand, the thicknesses of the glass fiber layers must not be higher than about 0.6 mm, since by using values higher than 0.6 mm, the tensile stresses due to the thermal contraction of the material could lead to the breakage of the heat-insulating wall in the dihedral angles thereof where are located the anchoring means which enable to fasten the invention material and to transfer and apply to specific areas and stresses resulting from the thermal contraction.

Using a too thick intermediate layer, having a thickness higher than about 0.1 mm, would lead to stresses, resulting from the thermal contraction, which could cause the breakage of the heat-insulating wall in the dihedral angles thereof. Moreover, such a high thickness would render the composite material more rigid and less easy to handle or use.

Moreover, the use of an intermediate layer having a thickness lower than 0.04 mm would result in a severe risk of having a permeable or porous structure for this layer, resulting in the loss of the fluid-tighness of the whole composite material.

It must also be noted that, should the said intermediate layer be made of aluminum, the aforesaid thickness range, i.e. 0.04 to 0.10 mm, enables to have aluminum sheets of great size, obtained by rolling and having for instance a width as high as 1.50 mm, and thus to prepare and use a composite material in the form of great area surface.

As regards the elastomeric lining used as covering layer of a fibrous end layer in a four layer material, it must be pointed out that a thickness lower than 0.3 mm would not enable this elastomeric lining to perform its function of mechanical protection; more particularly, in view of the surface irregularities of the fibrous-layer-elastomeric lining interface, the elastomeric layer has necessarily a varying thickness, the latter being minimum in the region of the peaks or bumps of the fibrous layer surface, so that the mechanical protection is insufficient or absent in such local areas or zones since the elastomer is more or less removed, by attrition, in such zones, which denudes the underlying glass fibers and results in a risk of breakage of the glass fiber layer. In contrast to this, when the thickness of the elastomeric lining or layer is between 0.3 and 1 mm, all zones of the underlying fibrous layer are perfectly protected and there is not any risk of breakage for this latter layer.

The use of glass fiber preferably to other types of fibers is justified by the high mechanical resistance of glass fiber with respect to such other fibers, except for the fibers made of aromatic polyamides or aramides, for example such as those known under the trade name "Kevlar" (manufactured by DUPONT-DENEMOURS); however, in spite of their great mechanical resistance which is higher than that of glass fiber, the fibers of Kevlar have a Young modulus and a thermal expansion coefficient very much higher than those of glass fiber and lead to the appearance of stresses, due to the thermal contraction, very higher than those generated by the thermal contraction of the glass fiber fabric (assuming that the composite material constitutes a fluid-tight barrier belonging to a heat insulating wall structure of a cryogenic tank). Consequently, glass fiber exhibits a whole set of optimum characteristics which justifies its use as a highly preferred material in the invention composite material.

Obviously, the glass fiber layer or glass fiber layers of the composite material according to the present invention may have any suitable particular structure or texture, a preferred texture being that a woven glass fiber fabric in view of its higher mechanical resistance.

It must also be noted that the invention composite material exhibits an excellent behaviour to cyclic fatigue and that its tightness with respect to either liquid or gas is very significantly improved with respect to the other supple membranes used in the heat insulating composite walls of the prior art tanks. Thus, when the pressure difference is of about 14 psi between the two sides of the membrane, the following results are obtained, for a leakage flow rate D, on the one hand in the case of a membrane made with an invention material comprising two fiber glass end layers and an intermediate aluminum layer and on the other hand in the case of membranes made of, respectively, "Mylar" (trade mark of a product manufactured by DUPONT DE NEMOURS), elastomeric silicone or butyl rubber:

invention material: $D = 6 \times 10^{-3}$ cm$^3$/j−m$^2$ membrane in "Mylar": $D = 12$ cm$^3$/j−m$^2$ membrane in silicone elastomer: $D = 3.9 \times 10^5$ cm$^3$/j−m$^2$ membrane in butyl rubber: $D = 1.9 \times 10^3$ cm$^3$/j−m$^2$ The prior art membranes referred to hereabove are also difficult to use on an industrial scale, since the assembling operations of a final continuous membrane consisting of sheets of the corresponding materials require a welding or gluing procedure with application of a squeezing pressure in contrast with the membrane made from the invention material as already indicated.

The following table shows the tensile strength characteristics of a composite material according to the first preferred embodiment thereof and comprising an intermediate aluminum layer between two glass fiber end layers, each glass fiber layer having a thickness of about 0.3 mm and the aluminum layer a thickness of about 0.04 mm.

|  | Test temperature | |
| --- | --- | --- |
|  | 20° C. | −196° C. |
| Strength required to break one meter of the membrane | 16.5 U.S.t. | 28.6 U.S.t |
| Stress at breaking σR | 42,900 psi | 750 psi |

It should be understood that the invention is not at all limited to the embodiments disclosed and shown which have been given by way of example only. In particular, it comprises all the means constituting technical equivalents of the means described as well as their combinations if carried out according to its gist and used within the scope of the appended claims.

What is claimed is:

1. A heat-insulated fluid-tight tank for holding very cold fluids, comprising a substantially rigid self-sustaining wall means for surrounding a hollow interior space in which a cryogenic fluid is adapted to be situated, said wall means having inner and outer surfaces, heat-insulating means engaging the inner surface of said wall means, said heat-insulating means terminating in a surface which is distant from and directed away from said wall means, and barrier-layer means situated next to and in engagement with the latter surface of said heat insulating means so as to be situated at the interior of said heat-insulation means and adapted to directly engage the cryogenic fluid, said barrier layer means being in the form of a relatively thin flexible laminated sheet material which includes a flexible glass-fiber fabric layer directly bonded to said surface of said heat insulation means, a thin, flexible, fluid-impervious metallic sheet made of a metal selected from the group consisting of aluminum, stainless steel, and Invar alloy and bonded to said glass-fiber fabric at a surface thereof opposite from said insulation means, a third layer bonded to the surface of said metallic sheet which is opposite from said glass-fiber fabric layer, said third layer being a glass-fiber fabric layer, said metallic layer having a thickness which is substantially less than the thickness of said glass-fiber fabric layer and said third layer, said barrier layer means further including a fourth layer for directly engaging the cryogenic fluid, said fourth layer being in the form of a thin, protective continuous film of plastic material, and wherein said barrier layer means is corrugated and has spaced portions which are directly bonded to said heat-insulation means while having between said spaced portions elongate portions, the area of which is sufficiently greater than the area of and distance between said spaced portions.

* * * * *